US008097063B2

(12) United States Patent
Kemeny et al.

(10) Patent No.: US 8,097,063 B2
(45) Date of Patent: Jan. 17, 2012

(54) SYSTEM FOR FURNACE SLOPPING PREDICTION AND LANCE OPTIMIZATION

(75) Inventors: Frank L. Kemeny, Lewiston, NY (US); David I. Walker, Bolton (CA)

(73) Assignee: Tenova Goodfellow Inc., Mississauga Ontario (CA)

( * ) Notice: Subject to any disclaimer, the term of this patent is extended or adjusted under 35 U.S.C. 154(b) by 36 days.

(21) Appl. No.: 12/714,326

(22) Filed: Feb. 26, 2010

(65) Prior Publication Data
US 2011/0209579 A1 Sep. 1, 2011

(51) Int. Cl.
C21C 5/32 (2006.01)
(52) U.S. Cl. .................. 75/375; 75/384; 75/387; 75/553
(58) Field of Classification Search .................... 75/553, 75/375, 387, 384
See application file for complete search history.

(56) References Cited

U.S. PATENT DOCUMENTS

| | | | | |
|---|---|---|---|---|
| 3,382,724 | A | * | 5/1968 | Wilcox ....................... 73/514.29 |
| 3,701,518 | A | | 10/1972 | Herff |
| 4,210,023 | A | | 7/1980 | Sakamoto et al. |
| 4,398,948 | A | | 8/1983 | Emoto et al. |
| 4,473,397 | A | | 9/1984 | Bleeck et al. |
| 5,028,258 | A | | 7/1991 | Aberl et al. |
| 5,557,631 | A | | 9/1996 | Bulat et al. |
| 5,584,909 | A | | 12/1996 | Kim |
| 6,108,609 | A | * | 8/2000 | Qian et al. ....................... 702/66 |
| 6,923,843 | B1 | | 8/2005 | Kemeny |
| 2004/0187641 | A1 | | 9/2004 | Kemeny |
| 2007/0247285 | A1 | | 10/2007 | Rajala |

OTHER PUBLICATIONS

Mucciardi, F., et al., "The use of Vibrations for Dynamic control in Primary Steelmaking Operations," Proceedings of the 67th Steelmaking Conference, pp. 221-229, Apr. 1, 1984.
O'Leary, K.E., et al., "The Accelerometer as a BOF Process Control Sensor," 67th Steelmaking Conference Proceedings, pp. 33-39, Mar. 29, 1987.
Chukwulebe, B.O., et al., "Computer Optimization of Oxygen Blowing Practices to Control BOF Slopping," Aistech Conference Proceedings, 2004, vol. 1, pp. 751-762, presented May 9, 2005.
Shakirov, M., et al., "Prediction and Prevention of Slopping in a BOF," Iron & Steel technology, pp. 38-44, Jan. 2004.
Walker, D. I. et al., "Vessel Slopping Detection," Aistech Conference Proceedings, 2005, vol. 1, pp. 711-722, presented May 9, 2005.
Birk, W., et al., "Physical Modelling and Control of Dynamic Foaming in an LD-Converter Process," pp. 2584-2590 vol. 4, Industry Applications Conference, 2000 Conference Record of the IEEE, Oct. 2000.

(Continued)

Primary Examiner — George Wyszomierski
Assistant Examiner — Tima M McGuthry Banks
(74) Attorney, Agent, or Firm — John M. Hammond; Patent Innovations LLC

(57) ABSTRACT

A method of making steel in a vessel comprising providing a lance for blowing oxygen on the surface of the steel in the vessel, the lance joined to a lance carriage and in communication with an accelerometer, the accelerometer in signal communication with a data acquisition module and a computer; charging the vessel with materials for steel making; lowering the lance into the vessel and injecting oxygen into the materials; acquiring a signal from the accelerometer indicative of lance vibration; processing the vibration signal to determine component frequencies of lance vibration; comparing the levels of the component frequencies to desired operating values; and adjusting at least one steel making process parameter based on the level of at least one of the component frequencies. The steel making process parameter to be adjusted may be oxygen flow rate through the lance.

6 Claims, 4 Drawing Sheets

OTHER PUBLICATIONS

"Steelmaking Smart Lance," pdf file of literature available at Corus Consulting Limited website http://www.corusconsulting.com/cctech/steelmaking.htm, file Properties indicate Gillian Taylor as author, Created Jun. 23, 2006.

"Application of Audiometery for BOS Control," pdf file of literature available at Corus Consulting Limited website http://www.corusconsulting.com/cctech/steelmaking.htm, file Properties indicate Gillian Taylor as author, Created Jun. 23, 2006.

Iida, Y., et al., "Fully Automatic Blowing Technique for Basic Oxygen Steelmaking Furnace," Kawasaki Steel Giho, 15 (1983), 126, Dec. 21, 1983.

PCT/US2010/025662 International Search Report and Written Opinion, Apr. 21, 2010 for the related PCT application.

\* cited by examiner

SYSTEM FOR FURNACE SLOPPING PREDICTION AND LANCE OPTIMIZATION

BACKGROUND

1. Field of the Invention

Control of a basic oxygen furnace in steel making, and more particularly, optimization of lance oxygen flow rate, slopping prediction and/or detection, and end point determination of a batch of steel.

2. Description of Related Art

In the top blown basic oxygen steel making process, a vessel is charged with a liquid carbon saturated iron alloy referred to as hot metal, scrap steel, and fluxes that provide CaO and MgO to the process. A water-cooled lance is inserted into the vessel through which oxygen is injected at supersonic speeds. The lance has at least one port and often multiple ports at the tip through which the oxygen exits and impinges onto the surface of the charge. The oxygen reacts with the metallic and carbon components of the charge, and heat is generated by the exothermic reactions. Over time, the oxygen reacts chemically and oxidizes substantially all of the silicon and aluminum that were present in metallic form in the charge.

In addition, most of the carbon in the charge is oxidized and the typical finished raw steel has a carbon content of between about 0.02% and about 0.06%, at which concentration the liquid steel is referred to as a flat bath. As the carbon approaches this low level, the oxygen also reacts with manganese and iron in the charge. At the flat bath condition, much of the manganese is oxidized and is present as MnO in the slag. Also at flat bath, the iron is oxidized to an extent that approaches equilibrium with the oxygen concentration in the steel. For example, oxygen content in the steel may reach about 0.08% with iron oxide concentration at about 28% in the slag at the conclusion of the blowing process. The slag is formed by the dissolution of the oxide components within each other, and may have about 40% CaO, 26% FeO, 10% $SiO_2$, 10% MgO, 5% $Al_2O_3$, 5% MnO and some other minor components making up the balance.

This slag can act beneficially to remove phosphorus and other impurities from the steel. The process of oxidation, heat generation and refining is complex and is monitored and controlled typically by a process model. The process model attempts to take into account the mass balance, thermal balance, thermodynamic reactions and kinetic rates to predict the end point and achieve the desired result in the shortest time and with the least cost. Many factors that cannot be accurately measured have influence on the process and therefore the process model is usually inadequate to cause a desired outcome every time. As a result, sometimes a re-blow is required to adjust the chemistry or temperature of the final steel. This is costly and time consuming. In addition, the process may cause slopping of the charge and ejection of steel, which results in yield loss and is costly. Slopping is an oscillation of the charge from side to side within the vessel, such that the charge advances and recedes along opposed portions of the vessel wall. When the slopping becomes extreme, the charge can surge over the upper rim of the vessel, resulting in an ejection of molten steel and slag therefrom.

There are many factors that can influence slopping and ejection of material from the basic oxygen furnace, commonly referred to as the BOF. Among them are the rate of oxygen injection, the silicon content of the charge, the height of the lance above the bath, the volume of the bath in comparison with the volume available in the BOF, the shape and aspect ratio of the BOF interior, the temperature of the bath, the extent to which carbon monoxide (CO) compound is further oxidized to $CO_2$, the wear of the lance tip ports, the shape and stability of the cavity formed by the oxygen impingement force, the extent of emulsification of metallic and oxide phases, and the chemical composition of the slag.

The problem of ejection of material due to slopping within the furnace is well known in the art and there have been many attempts at characterization and mitigation of this problem. It has been observed that slopping begins about 30% to about 60% of the way through the oxygen blowing period after the silicon in the charge is oxidized, and the slag becomes fluid and the CO generation rate is near its peak. In U.S. Pat. No. 5,584,909, Kim teaches reducing the oxygen blowing rate and the lance height above the bath near the peak CO generation period in order to prevent slopping. While this may be effective, it may slow the process and limit production rates. Also, the time at which the actions of reducing the blowing rate and the lance height need to be implemented are variable and not well known.

Another method of mitigation of slopping is to attempt to control the slag chemistry within the BOF. For example, it is thought that excess iron oxide can be formed when the bath penetration by the oxygen jet is not deep enough. The excess iron oxide can influence slag chemistry and may increase the amount of slopping. In U.S. Pat. No. 4,473,397, Bleeck, et al. teach the addition of calcium carbide to the slag within the BOF as slopping begins to reduce excess FeO content, thereby reducing the degree of slopping. The reagent calcium carbide is expensive and the effective amount can be variable. In addition, the optimal time of addition may not be known, so the reagent may be consumed prior to the actual time that it is needed. For these and other reasons, this method is not commonly used in the art.

The onset of slopping is typically preceded by a high rate of gas generation into the slag that causes foaming and rising of the slag toward the top of the BOF vessel. Therefore, it is believed that if the level of the slag within the vessel can be monitored, then the onset of slopping can be predicted. To this end, in U.S. Pat. No. 4,210,023, Sakamoto et al. teach the use of a microwave measuring apparatus to determine the height of the foaming slag within the BOF vessel. In practice, the microwave device is difficult to maintain due to the harsh environment within the BOF vessel. In U.S. Pat. No. 5,028,258, Aberl et al. teach the use of sound pick up devices to monitor sound emanating from the BOF vessel. The oxygen blowing onto the charge generates a sound, which is attenuated by the slag as it foams and rises up the length of the lance. Aberl et al. have correlated the amount of attenuation to the level of the slag as it rises within the vessel, so that mitigating action can be taken prior to the onset of slopping. In practice, there are many aspects that may influence the speed, frequency or intensity of sound that reaches the pick up device, including temperature and dust generation levels. As a result, the accuracy and efficacy of this method may not be sufficient. In addition, the pick up devices are prone to failure due to the harsh environment in which they are installed.

One aspect of slopping within the BOF vessel is the vibration of the vessel and the lance due to the momentum of the charge during the slopping event. The momentum may cause significant vibration in both the vessel and the lance assembly. In U.S. Pat. No. 4,398,948, Emoto et al. teach the monitoring of horizontal movement of the BOF lance with an accelerometer. The slopping action within the furnace causes the slag to impact the lance that causes horizontal movement and the extent of this horizontal lance acceleration is correlated to the extent of slopping within the furnace. While this method is simple and effective, some problems are associated with it. The single axis horizontal acceleration is sometimes insufficient to indicate the extent of slopping due to the impact angle and momentum variance on the lance in the furnace. The amount of slopping measured is not related to the amount of material ejected from the furnace or to the loss of iron units. Therefore, it is not determined exactly when to take mitigating measures against slopping. Thus the method is not predictive of slopping, but rather is indicative of slopping events already underway.

While not wishing to be bound by any particular theory, the applicants have determined that there is a frequency of interest in monitoring the lance vibration that is indicative of the impact of the oxygen jet into the impingement cavity. The intensity of this vibration is attenuated as the foaming slag rises up the length of the oxygen lance. By monitoring two frequencies, a higher one that is indicative of the vibration caused by the oxygen impact within the impingement cavity and a lower one that is indicative of the vibration of the lance due to impact by the slopping charge, more useful information is gleaned. (This concept was presented at the 2005 Association for Iron and Steel Technology conference in Charlotte, N.C. in a paper entitled "Vessel Slopping Detection", coauthored by the present inventors.)

The high frequency range amplitude attenuation was found to precede and be indicative of the impending slopping event evidenced by the low frequency range amplitude increase. This was an important finding since the mitigating action can now be taken prior to the actual onset of slopping and its effectiveness can be measured by monitoring the intensity of slopping at the same time. However, there are still deficiencies in the method as presented in the referenced paper. There is no absolute indication that relates the slopping intensity to the timing and amount of material ejection from the furnace. There is some acceptable level of slopping in all operations, and there is a desire to minimize process time and therefore maximize oxygen blow rate. However, the method of the aforementioned paper does not address what level of slopping is acceptable in the interest of maximizing steel production, while simultaneously minimizing cost. Furthermore, to the best of the applicants' knowledge, there is no quantitative correlation developed between the oxygen blow rate, lance height and slopping in the known art.

There remains a need for an apparatus and method of steelmaking in a basic oxygen furnace that can detect the onset of slopping, and then adjust the process conditions to prevent the slopping from causing ejection of steel from the vessel, while maintaining the desired chemistry of the charge, and throughput of conversion to finished steel ready for a pour. There is a further need for apparatus and method of steelmaking in a basic oxygen furnace that can more reliably detect the end point of the steelmaking process, such that excessive oxygen content is not introduced into the steel.

SUMMARY

Accordingly, embodiments of the present invention are provided that meet at least one or more of the following objects of the present invention.

An object of the present invention is to monitor the BOF lance vibration in all three axes, including vertical and horizontal, and in a plurality of frequencies, including ranges that are indicative of slopping impact on the lance and ranges that are indicative of energy dissipated by oxygen jet flow through the lance and ranges that are caused by oxygen jet impingement onto the bath surface.

Another object of the invention is to image the region around or under the BOF vessel to record material ejected from the vessel, and conduct image analysis to determine the relative quantity of material ejected and correlate the time and quantity of ejected material with the observed decrease or increase in the vibration at the frequency ranges of interest.

A further object of the invention is to monitor the vibration of the lance that is caused by the oxygen jet flowing through it and exiting it through the lance tip ports and into the cavity formed by the jet impingement, and to use the amplitude of that vibration to adjust the oxygen flow rate through the lance to an optimum level.

Another object of the invention is to monitor the vibration of the lance that is caused by rebound energy from the oxygen jet as it is deflected back toward the lance after impinging on the surface of the bath, and using this information to indicate slag height increase and impending slopping events.

Yet another object of the invention is to monitor the vibration of the lance corresponding to oxygen jet impingement onto the surface of the bath and correlate that vibration to the relative amount of carbon in the steel and thereby predict the end point of the oxygen blowing process, thereby reducing the requirement for re-blows.

More specifically, the present invention meets the aforementioned need with regard to slopping in the steelmaking vessel by providing a method of making steel in a vessel comprising providing a lance for blowing oxygen on the surface of the steel in the vessel, the lance joined to a lance carriage and in communication with an accelerometer, the accelerometer in signal communication with a data acquisition module and a computer; charging the vessel with materials for steel making; lowering the lance into the vessel and injecting oxygen into the materials; acquiring a signal from the accelerometer indicative of lance vibration; processing the vibration signal to determine component frequencies of lance vibration; comparing the levels of the component frequencies to desired operating values; and adjusting at least one steel making process parameter based on the level of at least one of the component frequencies. The steel making process parameter to be adjusted may be oxygen flow rate through the lance. The accelerometer may be a three-axis accelerometer, or alternatively, the lance may be provided with three single axis accelerometers measuring acceleration along three orthogonal axes.

In accordance with the invention, there is also provided a method of making steel in a vessel in which an incipient slopping event is detected. The method comprises providing a lance for blowing oxygen on the surface of the steel in the vessel, the lance joined to a lance carriage and in communication with an accelerometer, the accelerometer in signal communication with a data acquisition module and a computer; charging the vessel with materials for steel making; lowering the lance into the vessel and injecting oxygen into the materials; acquiring a signal from the accelerometer indicative of lance vibration; processing the vibration signal to determine component frequencies of lance vibration; comparing the long time average of the vibration signal to a short time average of the vibration signal; determining if the absolute value of the short time averaged signal has decreased below a first predetermined threshold; and if the absolute value of the short time averaged signal has decreased below the first predetermined threshold, producing a first signal indicative of an incipient slopping event in the vessel. The method may further include determining if the absolute value of the short time averaged signal has decreased below a second predetermined threshold, and if so, producing a second signal indicative of the occurrence of a slopping event in the vessel. The method may further include adjusting at least one steel making process parameter to halt the slopping event.

The process parameter may be oxygen flow rate through the lance and/or position of the lance in the vessel. The accelerometer may be a three-axis accelerometer or three single axis accelerometers as described above.

In accordance with the invention, there is also provided a method of making steel in a vessel in a threshold level of oxygen content in the steel is detected. The method comprises of providing a lance for blowing oxygen on the surface of the steel in the vessel, the lance joined to a lance carriage and in communication with an accelerometer, the accelerometer in signal communication with a data acquisition module and a computer; charging the vessel with materials for steel making; lowering the lance into the vessel and injecting oxygen into the materials; acquiring a signal from the accelerometer indicative of lance vibration; processing the vibration signal to determine component frequencies of lance vibration; comparing the long time average of the vibration signal to a short time average of the vibration signal; determining if the short time averaged vibration signal has exceeded a predetermined threshold indicative of oxygen level in the steel; and if so, producing a first signal indicative of oxygen content in the steel. The method may further include determining the extent to which the short time averaged vibration signal has exceeded the predetermined threshold value, and correlating the extent to which the short time averaged vibration signal has exceeded the predetermined threshold value to oxygen content in the steel. The method may further include determining if the absolute value of the short time averaged signal has begun to decrease after reaching the predetermined threshold, and if so, producing a second signal indicative of excessive oxygen content in the steel. The method may further include terminating the injection of oxygen through the lance after the predetermined threshold indicative of oxygen level has been reached. The accelerometer may be a three-axis accelerometer or three single axis accelerometers as described above.

In accordance with the invention, there is also provided an apparatus for making steel. The apparatus is comprised of a vessel, and a lance disposed in the vessel and configured for blowing oxygen onto the surface of the steel in the vessel. The lance is joined to a lance carriage comprising a three-axis accelerometer, and the accelerometer is in signal communication with a data acquisition module and a computer.

It is to be understood that the above methods of making steel are not mutually exclusive, and that the methods may be combined so as to achieve an optimum steel making process in which excessive slopping is prevented and optimum oxygen content of the steel is attained in the shortest process time possible.

BRIEF DESCRIPTION OF THE DRAWINGS

The present disclosure will be provided with reference to the following drawings, in which like numerals refer to like elements, and in which.

Figure 1:
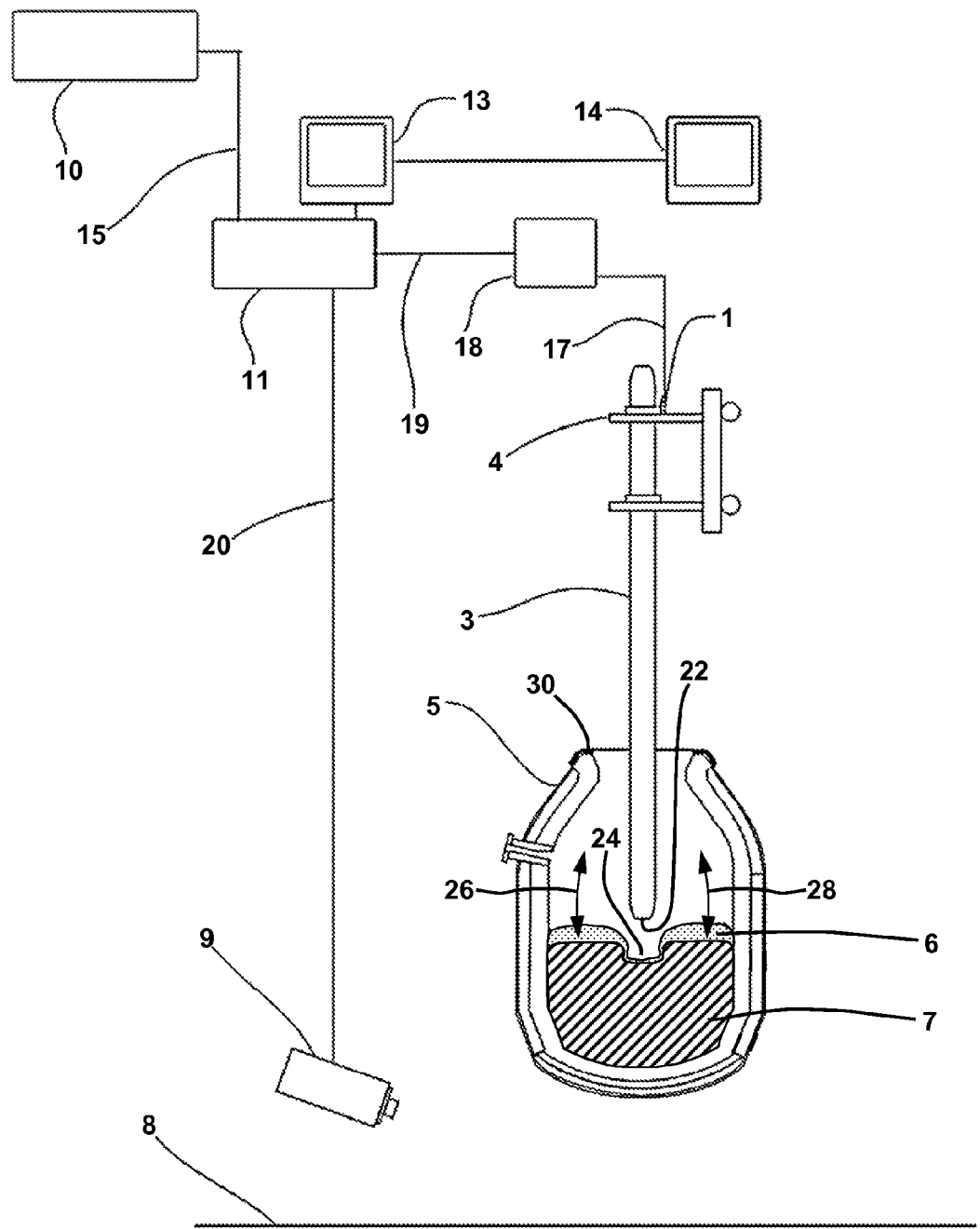
FIG. 1 is a schematic illustration of a basic oxygen furnace for making steel, and a system for monitoring and control of the furnace.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. Additionally, in this specification, all material compositions expressed as percentages are in weight percent.

Referring now to FIG. 1, a basic oxygen furnace vessel 5 is provided into which is placed a charge comprised of liquid hot metal, scrap and fluxes. An oxygen lance 3 is held by a lance carriage 4, which lowers the lance 3 into the vessel 5. Oxygen is injected through the oxygen lance 3, exiting through the ports (not shown) at the bottom 22 of the lance 3 at supersonic velocity, thereby creating a cavity 24 in the charge due to the force of impingement. The charge is converted into liquid steel 7 and slag 6 by the chemical reactions and heat generated within the vessel 5. The process creates turbulence within the vessel 5, and the slag 6 may increase in volume due to generation of gas by the chemical reactions. The slag 6 is moving within the vessel 5 and may impact the lance 3 with variable intensity.

During the steelmaking process, various forces are applied to the lance 3, and thus to the lance carriage 4 by which the lance is supported. The acceleration of the BOF vessel oxygen lance resulting from these forces is monitored by an accelerometer 1, which is in communication with the lance 3 by virtue of both the lance 3 and the accelerometer 1 being rigidly joined to the lance carriage 4. (Alternatively, the lance 3 may be in communication with three single axis accelerometers measuring acceleration along three orthogonal axes.) This acceleration is used to predict and measure slopping within the furnace 5, the stability of the cavity 24 formed by the impact of oxygen delivered by the lance 3, the suitability of the oxygen flow rate through the lance 3, and the approach to flat bath during the decarburization process thereby predicting end point of the blow. These parameters are all related and a plurality of information can be gained from monitoring the intensity of lance vibration.

Moreover, the optimum oxygen flow rate can be applied using the apparatus and methods of the invention, which reduces the tendency for slopping, reduces the wear rate of the lance tip and oxygen ejection ports, and accelerates the decarburization process. Furthermore, slopping is predicted and the degree of slopping is measured and related to the quantity of material ejection from the vessel 5. The mitigation measures can be applied as a response to the vibration measurement (made using the accelerometer 1) exceeding certain thresholds that indicate incipient severe slopping and material ejection. The approach to flat bath and end point decarburization can be monitored and can be used to supervise the BOF charge model, thereby preventing premature oxygen shut off and subsequent re-blow requirement, or excessive oxidation of the bath after the desired decarburization is achieved.

The oxygen lance 3 is joined to and thus in communication with the lance carriage 4, and vibration of the lance 3 is effectively transferred to the lance carriage 4. The lance carriage 4 is in a relatively safe environment away from the excessive heat and dust created in the BOF process. Therefore, the vibration of the lance 3 is monitored by placement of the accelerometer sensor 1 onto the lance carriage 4. The sensor 1 is a three-axis accelerometer that can monitor the vibration of the lance carriage 4, and therefore the lance 3, in all three orthogonal directions. The sensor 1 may be a three-axis integrated circuit piezoelectric accelerometer with a sensitivity of 100 mV/g. The accelerometer may have a sensitivity of between 100 and 1000 mV/g, depending upon the mass of the lance.

The accelerometer 1 is in electrical signal communication via a cable 17 with a data acquisition module 18 and a computer 11 comprising a central processing unit (not shown). Alternatively, the accelerometer 1 may be in wireless communication with the data acquisition module 18 and a computer 11. The analog vibration signal from the accelerometer 1 is analyzed by the data acquisition module 18, digitized, and communicated through cable 19 to the central processing unit of computer 11, where it is separated into frequency ranges using Fourier Transform.

Three frequency ranges of interest are identified. The first is a low frequency range that is created by the impact of furnace charge 6/7 against the lance 3. This region of interest is typically in the range 4 to 500 Hz. Other vibrations not related to slopping of the slag 6 within the furnace 5 are identified, such as the low frequency noise caused by building vibrations and the characteristic electrical noise in poorly isolated electronics that are around 60 Hz, and these are eliminated from the range of interest.

The second vibration frequency range of interest is around 500 to 5000 Hz, and is usually in the more narrow range of around 3000 to 4000 Hz. While not wishing to be bound by any particular theory, the applicants believe that vibrations in this frequency range of interest correspond to the vibration of the lance 3 caused by the oxygen flow down the lance 3 and exiting the lance ports. The amplitude of this vibration is influenced by the backpressure within the region between the lance tip 22 and the cavity 24 formed by the oxygen jet impinging on the bath surface. When a stable cavity is formed under the lance, the backpressure may stabilize the lance 3 and diminish the vibration intensity in this region of interest. If the lance 3 is too far away from the bath 6/7 or if the oxygen flow rate is too low, the stabilization effect is diminished and the vibration intensity is increased. As with the low frequency range of interest, extraneous vibrations in the high frequency range of interest are identified and eliminated from the measurement. For example, if the oxygen lance 3 is water cooled, the cooling water flowing through the lance 3 may cause significant vibration in frequencies that may include those in the region of interest. These are identified and eliminated from the control measurement.

A third frequency range of interest is identified that is thought to be caused by the rebound or echo effect of the oxygen jet as it bounces back from the cavity 24 and impacts the lance tip 22. This third frequency range of interest is also found in the range around 500 to 5000 Hz and is often a subset of the frequency range comprising the second range of interest described. The increase in gas generation rate and corresponding increase in foam height has been found to attenuate the impact of the rebounding jet against the lance tip 22. Therefore, the amplitude of this third frequency range can be used to indicate the increasing probability of an incipient slopping event.

The vibration amplitudes are integrated within each region of interest to correspond to a low and two high frequency lance vibration signals. The low frequency lance vibration signal is time averaged and is correlated with the degree of slopping within the vessel. (In FIG. 1, slopping is illustrated schematically by bidirectional arrows 26 and 28.) The severe slopping threshold is set at a level that corresponds with some material ejection from the furnace. A camera 9 is used to image an area around the BOF vessel to determine the relative material ejection quantity during the oxygen blowing process. For example, the camera 9 may image the pit area 8 underneath the furnace 5 into which ejected material may fall, or may image the mouth 30 of the vessel 5 from which material may project upward and outward. In either case, the camera 9 is in signal communication via cable 20 with the computer 11. The computer 11 performs analysis of images from camera 9, and calculates the severity of material ejection from the images.

The material ejected is usually an emulsion of slag and metal at high temperature, and thus appears very bright in the camera image. The brightness of the image may be measured in a unit of time and then integrated with time for the entire blowing period. The instantaneous brightness is indicative of the severity of any particular ejection event and the integrated brightness is indicative of the overall slopping amount during the blowing process on that particular batch of steel. The absolute slopping index as measured by normalized vibration amplitude in the low frequency region of interest may be correlated to slopping severity. This should preferably be done for each group of process parameters, since the slopping index relationship to the material ejection quantity may vary somewhat with slag chemistry, total slag weight, temperature, charge weight and furnace interior geometry.

A multivariate analysis may be used to identify the process parameters and their effect on the relationship between slopping index and material ejection rate. This may be incorporated into the BOF process model to scale the slopping index and identify thresholds above which mitigation measures are required. An operator interface screen 13 (or remotely located screen 14) indicates the slopping index during the process, and an operator (not shown) is alerted if the slopping is becoming too severe as indicated by exceeding the calculated threshold. Mitigating measures such as lowering the oxygen flow rate, raising the oxygen lance 3, increasing the post combustion, or addition of limestone coolant are then initiated to abate the slopping.

The first high frequency lance vibration signal is time averaged and is correlated with the stability of the lance/cavity system. Again, not wishing to be bound by any particular theory, the applicants have found that a stable cavity 24 with sufficient backpressure onto the lance tip 22 results in attenuation of the vibration intensity caused by oxygen flow down the lance 3 and through the lance tip ports. For a given lance height, port hole wear and port configuration, there is an optimum oxygen flow rate that creates a stable cavity 24 into which the oxygen flows, creating an optimum reaction zone with minimal impact wear on the lance tip 22.

If the oxygen flow is decreased for the given conditions, the cavity 24 fluctuates and backpressure on the lance tip 22 is variable. This creates the possibility of slag 6 and metal 7 splashing back onto the lance tip 22, creating wear. In addition, a less stable cavity 24 allows over-oxidation of the iron with respect to the remaining carbon in the bath 6/7, since the bulk mass transfer rate is negatively influenced. This over-oxidation increases the likelihood of excessive foaming and subsequent slopping in the vessel 5. If the oxygen flow rate is increased beyond the optimum amount, it may cause spattering of metal 7 and breakdown of the reaction cavity 24 due to chaotic and excessive force. While impact on the reaction rate may not be significant in this case, the wear on the lance tip 22 will most likely be excessive. For these reasons, establishing the optimum oxygen flow rate is important. The optimum oxygen flow rate will decrease as the lance 3 is lowered further toward the bath surface. The optimum oxygen flow rate will increase as the lance ports wear with use. However, in all cases observed, the optimum oxygen flow rate can be established by monitoring the vibration signal in this frequency region of interest.

The other factor that can influence the stability of the impingement cavity 24 is the surface tension of the steel bath. As the carbon is removed and dissolved oxygen increases, steel surface tension is reduced and the cavity 24 becomes less stable for a given set of process conditions. The destabilizing of the cavity 24 is realized in the increased vibration amplitude in the high frequency range. This happens near the end of the process, close to the flat bath condition. Since by this time, slopping has subsided and the lance 3 has been optimized, a reproducible correlation can be established between oxygen level in the steel 7 and increasing vibration intensity. Of course, carbon level in the steel 7 is related to oxygen, so the end point determination by this method becomes possible. There is a characteristic rise in the vibration amplitude of the lance 3 that starts when the carbon concentration in the bath is around 0.06% and continues until the carbon content is around 0.03%. The correlation is dependent on the relationship between oxygen content and carbon content for the particular conditions of the batch of steel 7 in the vessel 5. This relationship is often expressed in the art as the carbon oxygen reaction product, typically having values between 20 and 30. That is, percent carbon in the steel 7 multiplied by parts per million of oxygen in the steel 7 typically yields a value of around 25 plus or minus 5 depending on process parameters. Using this method, the vibration intensity in the high frequency range of interest can be input to the process model and used to predict batch end point in conjunction with other parameters such as $CO/CO_2$ ratio, temperature, and mass and energy balances.

The second high frequency lance vibration signal is time averaged and is correlated with the conditions that indicate the high probability of incipient slopping events. Prior to the onset of slopping, the degree of foaming of the slag in the vessel 5 may increase rapidly. As the gas generation rate in the cavity 24 increases and the foaming slag rises up the length of the lance 3, the vibration signal caused by the rebounding oxygen jet impacting the lance tip 22 is attenuated. This attenuation is particularly prevalent in the high frequency range of interest. In the process stage where slopping typically occurs, after oxygen flow rate has been optimized and lance height is constant at the desired position, an attenuation of the second high frequency amplitude is indicative of the possible onset of slopping. A threshold level is established empirically, and if the signal drops below the threshold level indicating incipient slopping, the operator is alerted and mitigation measures are applied. The mitigation measures may include raising the lance 3 and decreasing the oxygen flow rate. Once the vibration intensity again increases above the threshold, the optimum lance position and oxygen flow may be reapplied.

EXAMPLES

The following examples of aspects of the invention are provided for illustrative purposes, and are not be construed as limiting the invention to the apparatus and methods described therein.

Example 1

Lance Oxygen Flow Rate Optimization

A BOF vessel 5 was charged with molten hot metal, scrap and fluxes. After charging the furnace 5, the furnace 5 was rotated to the vertical position and a lance 3 was lowered into the vessel 5. Oxygen was injected through the lance 3 and its force of impingement as it exited the lance ports at tip 22 formed a cavity 24 on the surface of the charge 6/7. As oxygen was injected during the process, the removal of carbon and the formation of a liquid slag 6 proceeded.

A three-axis integrated circuit piezoelectric accelerometer 1 was mounted on the lance carriage 4 to monitor the lance carriage vibration resulting from oxygen flow through the lance 3 and from other process variables. The vibrations were converted to an analog electrical signal that was digitized using a data acquisition system 18 and computer 11.

The digital signal was processed using a Fourier Transform to determine the component frequencies. Vibration amplitude in the frequency range of 3600-4000 Hz was integrated to yield a vibration characteristic of the oxygen flow through the lance 3 exiting the lance tip ports and causing variable backpressure in the cavity 24 formed by oxygen impingement. The vibration level was normalized by dividing by a maximum level to yield a vibration level in the range of 0 to 1. The maximum value was determined by observing a number of heats (batches of steel made) and recording the maximum value attained.

A horizontal bar graph on the operator interface 14 was created to display an indication of the normalized vibration level. The display showed red, shades of green to red, and green depending upon the vibration level range. At a minimum vibration level, the indicator displayed a maximum green bar graph. At a maximum vibration level, the indicator displayed a small bar graph colored red. At levels in between the bar graph is colored shades of green to red.

The oxygen flow rate was increased or decreased to minimize the vibration. This operation was assisted by a bar graph on the operator interface 14. When the green bar was at a maximum, the vibration amplitude at the characteristic frequency range was at a minimum and the lance oxygen flow was optimum for the particular lance tip 22 with the current amount of wear on that particular batch of steel. In the case described by this example, that flow rate was 1100 standard cubic meters per minute.

Figure 2:
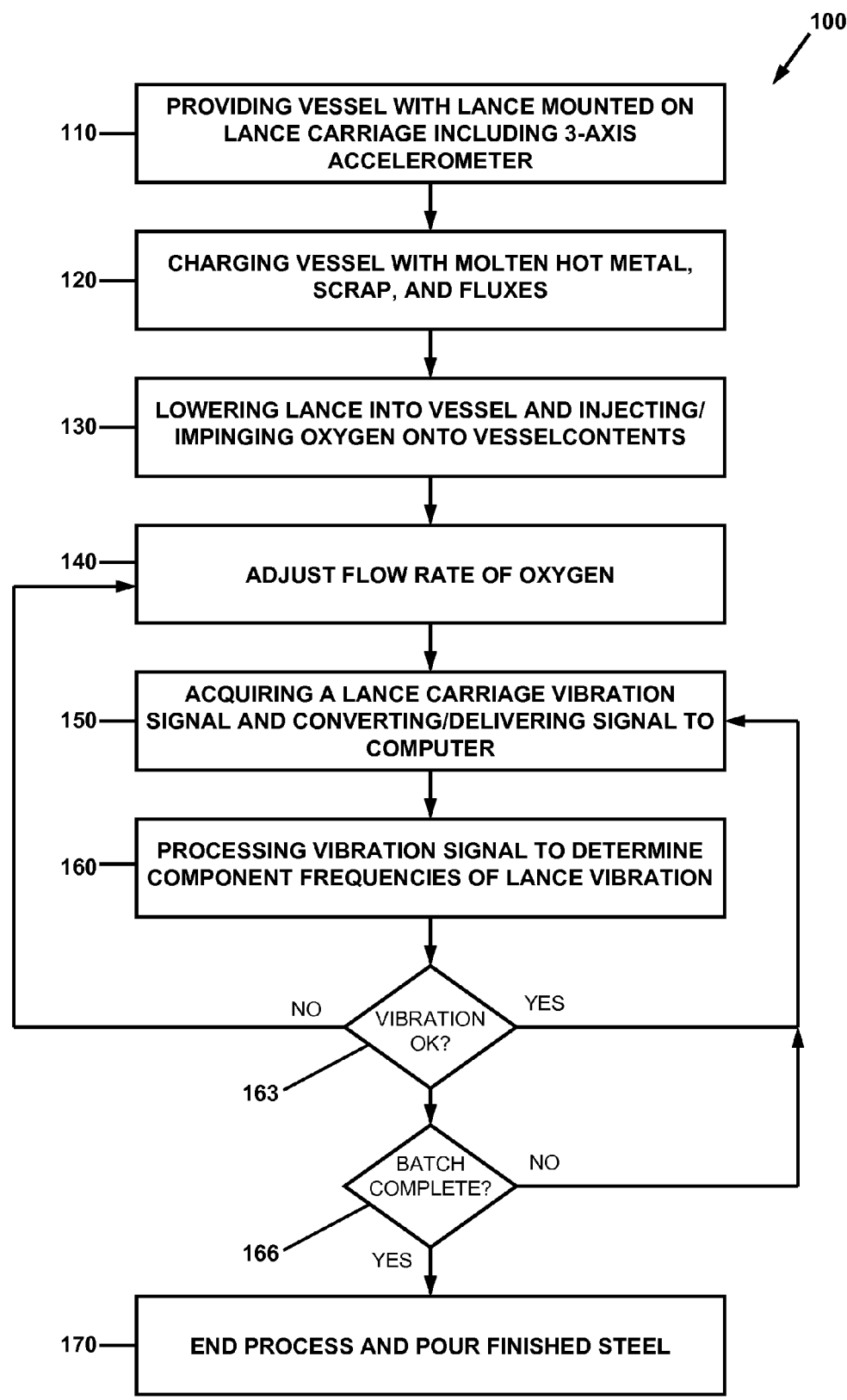
FIG. 2 is a flowchart of a first method of making steel according to the present invention.

This example is representative of one embodiment of the applicants' method of making steel as shown in FIG. 2. Referring also to FIG. 1, in step 110 of method 100, a vessel 5 is provided with a lance 3 mounted on a lance carriage 4, which includes a 3-axis accelerometer 1. The vessel 5 is charged with molten hot metal, scrap, and fluxes in step 120, and the lace 3 is lowered into the vessel 5, and injection of oxygen onto the surface of the charge is begun in step 130. An initial adjustment of the flow rate of oxygen may be made in step 140. In step 150, data signals from the accelerometer that are indicative of lance vibration is acquired and delivered to the computer 11. The data is processed to determine component frequencies of lance vibration in step 160.

A comparison of the levels of the frequencies of lance vibration is made in step 163. If the levels are within predetermined desired ranges, no action is taken, and vibration data continues to be acquired and processed according to steps 150 and 160. If one or more of the levels are outside of the desired ranges, a process parameter may be adjusted to bring the vibration level(s) back within the desired range(s). The process parameter may be oxygen flow rate per step 140. An additional check is made in step 166; if other parameters, such as oxygen content of the batch as indicated by lance vibration (see Example 4 herein) indicate that the batch is complete, the process is terminated in step 170. The oxygen flow through the lance 3 is terminated, and the lance 3 is withdrawn from the vessel 5.

Example 2

Incipient Slopping Prediction

A BOF vessel 5 was charged with molten hot metal, scrap and fluxes. After charging the furnace 5, the furnace 5 was rotated to the vertical position and a lance 3 was lowered into the vessel 5. Oxygen was injected through the lance 3 and its force of impingement as it exited the lance ports formed a cavity 24 on the surface of the charge 6/7. As oxygen was injected during the process, the removal of carbon and the formation of a liquid slag 6 proceeded.

A three-axis integrated circuit piezoelectric accelerometer 1 was mounted on the lance carriage 4 to monitor the lance carriage vibration resulting from oxygen flow through the lance 3 and from other process variables. The vibrations were converted to an analog electrical signal that was digitized using a data acquisition system 18 and computer 11.

The digital signal was processed using a Fourier Transform to determine the component frequencies. Vibration amplitude in the frequency range of 3800-4000 Hz was integrated to yield a vibration characteristic of the oxygen flow rebounding from the cavity 24 back to the lance 3. The long time averaged vibration signal is compared to the short time averaged vibration signal. If the value of the short time averaged signal decreased below a predetermined threshold, in this case 20% of the long time averaged signal value, then the operator was alerted to the conditions for incipient slopping event.

Figure 3:
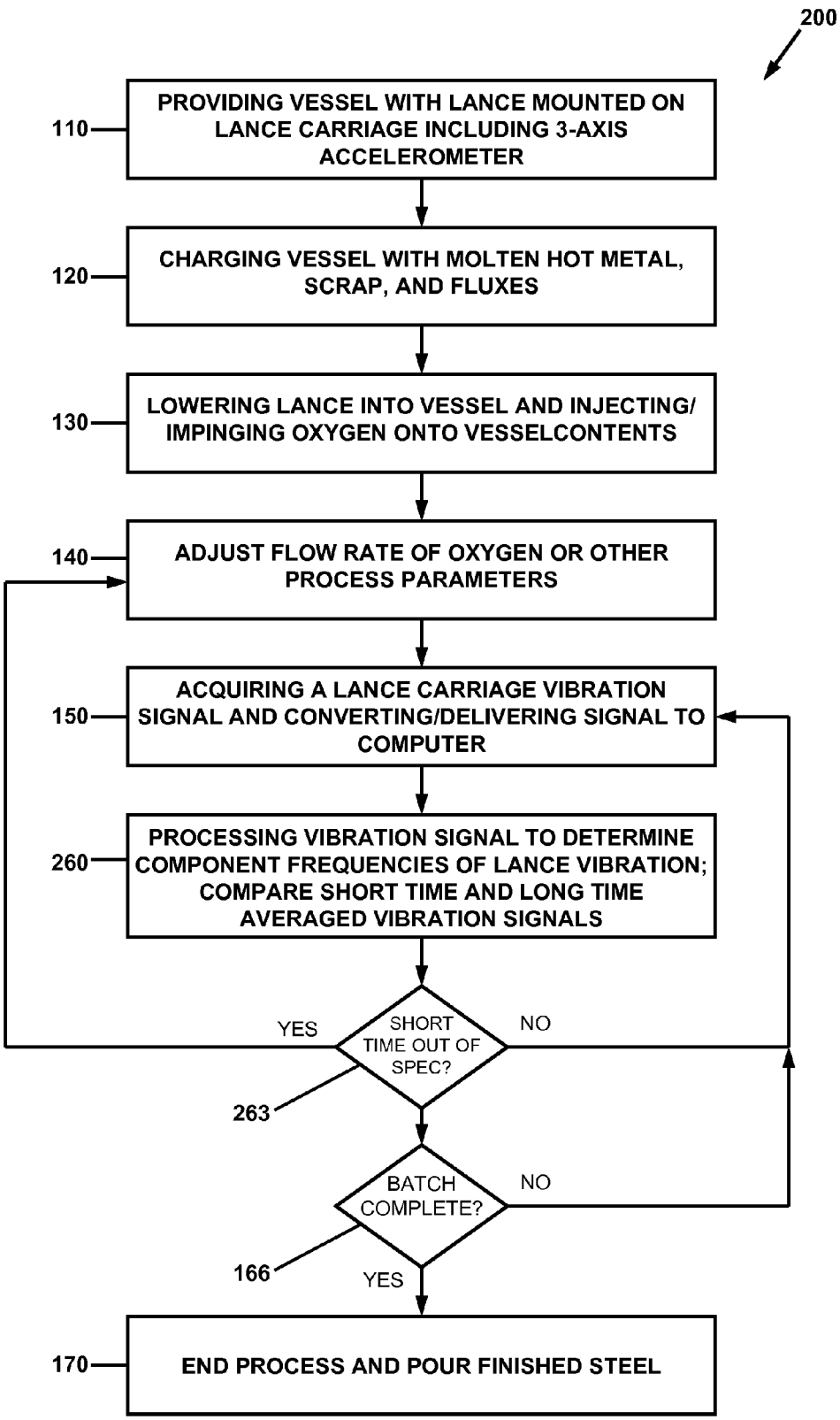
FIG. 3 is a flowchart of a second method of making steel according to the present invention.

This example is representative of another embodiment of the applicants' method of making steel as shown in FIG. 3. Referring also to FIG. 1, the method 200 is comprised of substantially the same steps 110-150 as described previously for method 100 of FIG. 2. In step 260, the short and long term vibration signals are compared as described above. Based upon the comparison in step 263 as described above, steps 150 and 260 may continue; of if the value of the short time averaged signal decreases below a predetermined threshold, a signal (such as an indicator on the display 14, or an alarm light or sound) indicative of an incipient slopping event in the vessel is delivered.

Example 3

Slopping Detection

A BOF vessel 5 was charged with molten hot metal, scrap and fluxes. After charging the furnace 5, the furnace 5 was rotated to the vertical position and a lance 3 was lowered into the vessel 5. Oxygen was injected through the lance 3 and its force of impingement as it exited the lance ports formed a cavity 24 on the surface of the charge 6/7. As oxygen was injected during the process, the removal of carbon and the formation of a liquid slag 6 proceeded.

A three-axis integrated circuit piezoelectric accelerometer 1 was mounted on the lance carriage 4 to monitor the lance carriage vibration resulting from oxygen flow through the lance 3 and from other process variables. The vibrations were converted to an analog electrical signal that was digitized using a data acquisition system 18 and computer 11.

The digital signal was processed using a Fourier Transform to determine the component frequencies. Vibration amplitude in the frequency range of 4-500 Hz was integrated to yield a vibration characteristic of material impacting the lance 3, particularly slag and steel emulsion slopping. The long time averaged vibration signal is compared to the short time averaged vibration signal. If the value of the short time averaged signal exceeds a predetermined threshold, in this case 80% of the long time averaged signal value, then the operator was alerted to the occurrence of a slopping event.

The threshold value of 80% was determined by observation of the pit, and correlating that result with the degree of increase in the short time averaged vibration signal relative to the long time averaged vibration signal.

Example 4

End Point Determination

A BOF vessel 5 was charged with molten hot metal, scrap and fluxes. After charging the furnace 5, the furnace 5 was rotated to the vertical position and a lance 3 was lowered into the vessel 5. Oxygen was injected through the lance 3 and its force of impingement as it exited the lance ports formed a cavity 24 on the surface of the charge 6/7. As oxygen was injected during the process, the removal of carbon and the formation of a liquid slag 6 proceeded.

A three-axis integrated circuit piezoelectric accelerometer 1 was mounted on the lance carriage 4 to monitor the lance carriage vibration resulting from oxygen flow through the lance and from other process variables. The vibrations were converted to an analog electrical signal that was digitized using a data acquisition system 18 and computer 11.

The digital signal was processed using a Fourier Transform to determine the component frequencies. Vibration amplitude in the frequency range of 3600-4000 Hz was integrated to yield a vibration characteristic of the stability of the cavity 24 formed by the impingement of oxygen exiting the lance ports and impacting the bath. The long time averaged vibration signal was compared to the short time averaged vibration signal. Once the short time averaged vibration signal exceeded the predetermined threshold, the operator was alerted to the increasing oxygen level in the steel 7 and the proximity to flat bath end point. As the rate of change of the short time averaged signal began to decrease again, the operator was alerted to the possibility of an over blowing situation resulting in excessive oxygen content of the steel 7. Upon analysis, it was proved that indeed the steel was finished in an over blown state, with oxygen over 900 parts per million and carbon less than 0.024% in the steel. Over-blowing the steel is costly, since it causes yield loss, increased reagent demand, increased refractory lining wear, and decreased production rate. If the operator had heeded the signal indicating approach to flat bath, the over-blowing event may have been averted.

Figure 4:
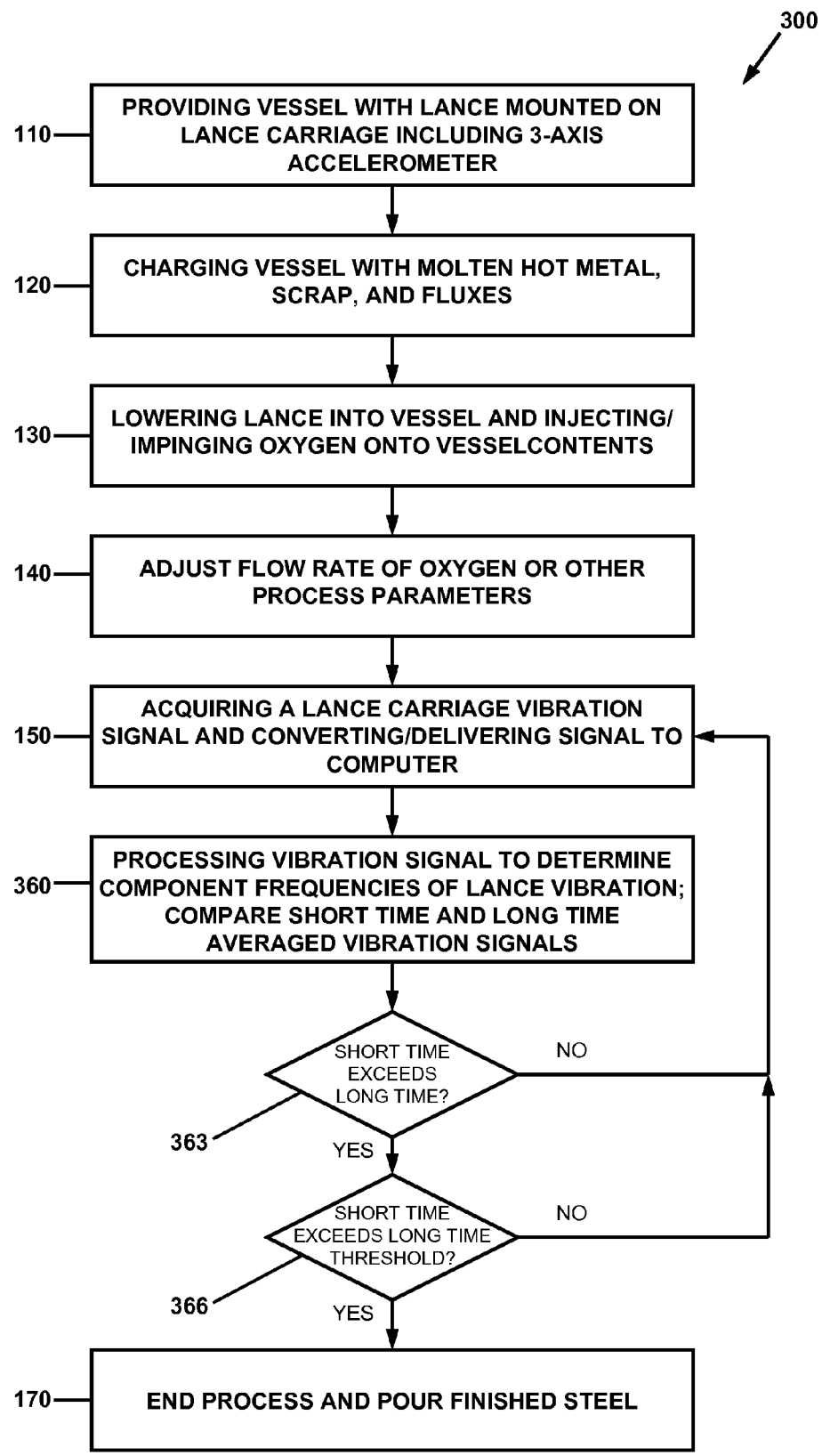
FIG. 4 is a flowchart of a third method of making steel according to the present invention.

This example is representative of another embodiment of the applicants' method of making steel as shown in FIG. 4. Referring also to FIG. 1, the method 300 is comprised of substantially the same steps 110-150 as described previously for method 100 of FIG. 2. In step 360, the short and long term vibration signals are compared as described above. Based upon the comparison in step 363 as described above, steps 150 and 360 may continue; or if the short time averaged vibration signal, which is indicative of oxygen content in the steel, exceeds the predetermined threshold, a signal may be provided to alert the operator to the increasing oxygen level in the steel 7 and the proximity to flat bath end point. A determination is made in step 366 as to whether the batch is complete, and if so, the process is terminated in step 170.

Example 5

Additional Batch Example

A BOF vessel 5 was charged with molten hot metal, scrap and fluxes. After charging the furnace 5, the furnace 5 was rotated to the vertical position and a lance 3 was lowered into the vessel. Oxygen was injected through the lance 3 and its force of impingement as it exited the lance ports formed a cavity 24 on the surface of the charge 6/7. As oxygen was injected during the process, the removal of carbon and the formation of a liquid slag 6 proceeded.

A three-axis integrated circuit piezoelectric accelerometer 1 mounted on the lance carriage 4 was used to monitor the lance carriage vibration resulting from oxygen flow through the lance 3 and from other process variables. The vibrations were converted to an analog electrical signal that was digitized using a data acquisition system 18 and computer 11.

The computer 11 received input from the BOF process computer 10 and programmable logic controller (PLC) via communications network or cable 15. When the indication was received that the blowing process had started, the vibration monitoring software residing in the computer 11 started the detection algorithm. Vibration monitoring and analysis proceeded until the PLC information was received that the blowing process was complete and stopped. At that time, the detection algorithm was also stopped and the recording of the steel batch process and associated vibration indications was processed, resulting in the generation of a report.

For example, when a conveyor belt (not shown) began to make an addition of CaO to the vessel, the PLC 10 informed the computer 11, and the detection algorithm was suspended until the PLC 10 informed the computer 11 that the conveyor had stopped. This communication with the PLC 10 facilitated accurate analysis of the lance vibrations due to the process without erroneous results due to extraneous vibrations.

The digital signal was processed using a Fourier Transform to determine the component frequencies. Vibration amplitude in the frequency range of 3600-4000 Hz was isolated and used to yield a vibration characteristic of the oxygen flow through the lance 3 exiting the lance tip ports and causing variable backpressure in the cavity 24 formed by oxygen impingement. The vibration level was normalized by dividing by a maximum level to yield a vibration level in the range of 0 to 1. The maximum value was previously determined by observing a number of heats and recording the maximum value attained.

A horizontal bar graph on the operator interface 14 was created to display the normalized vibration level. The display showed red, shades of green to red, and green depending upon the vibration level range. At a minimum vibration level, the indicator displayed a maximum green bar graph, indicating optimum oxygen flow rate through the lance 3 had been established. At a maximum vibration level, the indicator displayed a small bar graph colored red, indicating that action was necessary to optimize the oxygen flow rate through the lance 3. At levels in between, the bar graph was colored shades of green to red.

The oxygen flow rate was increased or decreased to minimize the vibration. This operation was assisted by the described bar graph on the operator interface 14. When the green bar was at a maximum, the vibration amplitude at the characteristic frequency range was at a minimum, and the lance oxygen flow was optimum for the particular lance tip with the current amount of wear on that particular batch of steel. In this case described by this example, that flow rate was 1100 standard cubic meters per minute.

Vibration amplitude in the frequency range of 4-60 Hz was isolated to yield a vibration characteristic of material impacting the lance 3, particularly slag and steel emulsion slopping. The long time averaged vibration signal was compared to the short time averaged vibration signal. If the value of the short time averaged vibration signal exceeded the predetermined threshold, in this case 175% of the long time averaged signal value, then the operator was alerted to the occurrence of a slopping event.

The threshold value was determined by observation of the instantaneous and integrated image brightness in analyzing the images from the pit camera 9, and correlating that result with the degree of increase in the short time averaged vibration signal relative to the long time averaged vibration signal.

When the operator was alerted of the occurrence of a slopping event, the oxygen lance 3 was raised and the oxygen flow rate was lowered as remedial action.

The lance vibration frequency range of 3600-4000 Hz that was used to optimize lance stability was also used to indicate end point of the oxygen blowing process. Once the blowing process had proceeded to 80% complete, there was no significant chance of any further slopping. The lance oxygen flow was optimized. The long time averaged vibration signal was compared to the short time averaged vibration signal in this frequency range. At no time did the short time averaged vibration signal exceed the predetermined threshold that was indicative of nearing the flat bath condition. Nevertheless, the process model instructed the PLC 10 to finish the blow and the batch of steel 7 was deemed to be processed. Upon analysis, it was found that the carbon content of the steel was too high and did not meet specification. The target carbon was below 0.05% and the actual carbon was 0.06%. The oxygen lance was re-inserted into the vessel and further blowing took place to correct the chemistry. This re-blow was costly and time consuming, and could have been averted if the lance vibration signal analysis was incorporated into the process model. The lance vibration analysis indicated that the end point had not been reached.

It is, therefore, apparent that there has been provided, in accordance with the present invention, an apparatus and methods for controlling a basic oxygen furnace in steel making. Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

We claim:

1. A method of making steel in a vessel, the method comprising:
   a. providing a lance for blowing oxygen on the surface of the steel in the vessel, the lance joined to a lance carriage and in communication with an accelerometer, the accelerometer in signal communication with a data acquisition module and a computer;
   b. charging the vessel with materials for steel making;
   c. lowering the lance into the vessel and injecting oxygen into the materials;
   d. acquiring a signal from the accelerometer indicative of lance vibration;
   e. processing the vibration signal to determine component frequencies of lance vibration;
   f. comparing a long time average of the vibration signal to a short time average of the vibration signal;

g. determining if the short time averaged vibration signal has exceeded a predetermined threshold indicative of oxygen level in the steel; and h. if the short time averaged vibration signal has exceeded the predetermined threshold, producing a first signal indicative of oxygen content in the steel.

2. The method of claim 1, further comprising determining the extent to which the short time averaged vibration signal has exceeded the predetermined threshold value, and correlating the extent to which the short time averaged vibration signal has exceeded the predetermined threshold value to oxygen content in the steel.

3. The method of claim 1, further comprising determining if the value of the short time averaged signal has begun to decrease after reaching the predetermined threshold, and if the value of the short time averaged signal has begun to decrease after reaching the predetermined threshold, producing a second signal indicative of excessive oxygen content in the steel.

4. The method of claim 1, further comprising terminating the injection of oxygen through the lance after the predetermined threshold indicative of oxygen level has been reached.

5. The method of claim 1, wherein the accelerometer is a three-axis accelerometer.

6. A method of making steel in a vessel, the method comprising:
   a. providing a lance for blowing oxygen on the surface of the steel in the vessel, the lance joined to a lance carriage and in communication with an accelerometer, the accelerometer in signal communication with a data acquisition module and a computer;
   b. charging the vessel with materials for steel making;
   c. lowering the lance into the vessel and injecting oxygen into the materials;
   d. acquiring a signal from the accelerometer indicative of lance vibration;
   e. processing the vibration signal to determine component frequencies of lance vibration;
   f. comparing a long time average of the vibration signal to a short time average of the vibration signal;
   g. determining if the value of the short time averaged signal has decreased below a first predetermined threshold;
   h. if the value of the short time averaged signal has decreased below the first predetermined threshold, producing a first signal indicative of an incipient slopping event in the vessel; and
   i. determining if the value of the short time averaged signal has increased beyond a second predetermined threshold, producing a second signal indicative of the occurrence of a slopping event in the vessel.

\* \* \* \* \*